US006823237B1

(12) United States Patent
Bodie

(10) Patent No.: US 6,823,237 B1
(45) Date of Patent: Nov. 23, 2004

(54) METHOD AND SYSTEM FOR REGENERATION OF MISPROCESSED MAILPIECES OR THE LIKE

(75) Inventor: Kevin W. Bodie, Bethel, CT (US)

(73) Assignee: Pitney Bowes Inc., Stamford, CT (US)

(*) Notice: Subject to any disclaimer, the term of this patent is extended or adjusted under 35 U.S.C. 154(b) by 986 days.

(21) Appl. No.: 09/134,977

(22) Filed: Aug. 17, 1998

(51) Int. Cl.[7] .............................................. G06F 07/00

(52) U.S. Cl. ....................... 700/223; 700/220; 700/221; 700/222; 700/227

(58) Field of Search ................................ 700/220, 221, 700/222, 223, 227; 705/400, 406, 410; 53/381.5; 5/381.5

(56) References Cited

U.S. PATENT DOCUMENTS

| | | | | | |
|---|---|---|---|---|---|
| 4,800,505 | A | * | 1/1989 | Axlrod et al. | 364/478 |
| 4,829,443 | A | * | 5/1989 | Pintsov et al. | 364/464.03 |
| 5,067,088 | A | * | 11/1991 | Schneiderhan | 364/478 |
| 5,119,306 | A | * | 6/1992 | Metelits et al. | 364/464.02 |
| 5,175,691 | A | * | 12/1992 | Baker et al. | 364/478 |
| 5,363,967 | A | * | 11/1994 | Tilles et al. | 209/539 |
| 5,419,440 | A | * | 5/1995 | Picoult | 209/583 |
| 5,464,099 | A | * | 11/1995 | Stevens et al. | 209/3.1 |
| 5,573,277 | A | * | 11/1996 | Petkovsek | 283/79 |
| 5,659,481 | A | * | 8/1997 | Qutub et al. | 364/478.08 |
| 5,675,650 | A | * | 10/1997 | Cordery et al. | 380/23 |
| 5,726,897 | A | * | 3/1998 | Tammi et al. | 364/478.09 |
| 5,745,590 | A | | 4/1998 | Pollard | 382/101 |
| 5,777,883 | A | * | 7/1998 | Lau et al. | 364/478.08 |
| 5,917,925 | A | * | 6/1999 | Moore | 382/101 |
| 6,002,095 | A | * | 12/1999 | Bodie et al. | 209/584 |

* cited by examiner

*Primary Examiner*—Donald P. Walsh
*Assistant Examiner*—Michael E. Butler
(74) *Attorney, Agent, or Firm*—Michael J. Cummings; Charles R. Malandra, Jr.; Angelo N. Chaclas

(57) ABSTRACT

A method and system for regenerating misprocessed mailpieces and the like. Control documents are produced by a data processing system and transported to an inserter system. The inserter system inputs the control documents and assembles mailpieces in accordance with coded information on the documents. If the inserter system controller identifies a misprocessed mailpiece it writes a record, which can be a separate zero byte file, to a common data store. The data processing system accesses the record in the common data store and regenerates the control document. The inserter system processes the regenerated control document to regenerate the mailpiece.

12 Claims, 5 Drawing Sheets

METHOD AND SYSTEM FOR REGENERATION OF MISPROCESSED MAILPIECES OR THE LIKE

BACKGROUND OF THE INVENTION

This invention relates to the preparation of large mailings and the like. More particularly it relates to systems and apparatus for the preparation of documents and the assembly of multiple mailpieces including such documents.

The term "mailpieces" as used herein means items intended to be delivered by a postal service or private courier service. Typically preparation of mailpieces includes, but is not limited to, printing or otherwise providing documents including variable information pertaining to addressees of the mailpieces and the assembly of such documents with other elements of the mailpiece. The term "assembly" as used herein means the execution of actions to incorporate the documents into mailpieces. Typically, such actions can include: accumulating documents with other materials such as preprinted inserts, folding and inserting the resulting accumulations into envelopes, printing addresses and other information on the outside of the envelopes, and franking the mailpiece with an appropriate postage amount.

Inserter systems for the assembly of mailpieces are well known. A typical inserter system is shown in FIG. 1. Inserter system 10 includes burster/feeder 12 which inputs preprinted documents in fanfold form, separates the documents and removes and discards sprocket feed strips FS from the edges of the document. Each group of documents for a particular mailpiece includes at least control document CD. On control documents CD strips FS are marked with code BC which is read by scanner 14 before strips FS are removed. In simpler systems code BC can be a "dash code" of the type known for use in directly controlling inserter systems. In newer, more complex systems code BC can be a conventional bar code which serves as a pointer to a mailpiece record which record contains information for controlling the inserter; as will be more fully described below. In other known inserter systems, a cut sheet document feeder can be used in place of burster/feeder 12 and documents can be in cut sheet form.

Control document CD, and any additional associated pages P are fed from burster feeder 12 to accumulator 16 where documents for each mailpiece are formed into separate accumulations A and folded.

Accumulation A is then fed to insert stations 20A and 20B where preprinted inserts I are added to form accumulations A1 and A2. Those skilled in the art will of course recognize that the number of such insert stations used will vary from application to application.

Accumulation A2 is then fed to insert station 22 where it is inserted into an envelope and sealed to form mailpiece MP.

Mailpiece NP is then fed to address printer 24 which prints address AD on the outside of the envelope. Depending on the size of the print field of printer 24, printer 24 also can be used to print other information such as a variable return address (or other text message) RA, logo L, and postal barcode PBC on the envelope. (Those skilled in the art will recognize that dash codes as described above typically cannot include sufficient information to define even address AD so that systems incorporating dash codes typically use window envelopes to provide addressing information.)

System 10 also includes outstacker 30 for diverting mailpieces when an error is detected.

As noted above, inserter systems wherein said code BC is a barcode which is used as a pointer to a mailpiece record (i.e. an electronic record associated with a mailpiece to be assembled) are known. By incorporating data for controlling assembly of mailpieces in mailpiece records an essentially unlimited amount of data can be associated with each mailpiece. Thus addresses, return addresses, logos, and postal bar codes can all readily specified in addition to specification of the number of inserts to be added at each insert feeder, postage amounts, etc. Systems incorporating such mailpiece records are described in commonly assigned U.S. Pat. No. 4,800,505; to: Axelrod et al.; for: Mail Preparation System; issued Jan. 24, 1989, which is hereby incorporated by reference. Embodiments of the system of U.S. Pat. No. 4,800,505 are marketed by the assignee of the present application under the name "Direct Connection", described in *The Direct Connection*, version 1.30.

A typical MRDF record which is associated with a mailpiece to be processed is shown in Table 1 below.

TABLE I

MRDF Record

| Start | Length | Description |
|---|---|---|
| 1–60 | 60 | Full Name |
| 61–120 | 60 | Address 1 |
| 121–180 | 60 | Address 2 |
| 181–240 | 60 | Address 3 |
| 241–300 | 60 | Street (Primary) |
| 301–328 | 28 | City |
| 329–344 | 15 | State |
| 345–349 | 5 | Zip 5 |
| 350–353 | 4 | Zip + 4 |
| 354–355 | 2 | Zip + 2 |
| 356–360 | 10 | Carrier Route |
| 361–362 | 2 | Presort Type (EC/CC/P/R) |
| 363–372 | 10 | Sequence # (Piece ID) |
| 373–379 | 7 | Job ID |
| 380 | 1 | Break 1 Flag (Y/N) |
| 381–382 | 2 | Outsort (Bin #) |
| 383 | 1 | Sealer (Y/N) |
| Total Length | 383 | |

In the record shown in Table 1, bytes 1–60 specify the addressee's name; bytes 61–240 specify 3 lines of additional addressee information such as additional addressees, titles, etc.; bytes 241–344 specify the address; bytes 345–355 specify the Zip Code with either a two or four digit extension; bytes 356–360 specify a carrier route; bytes 361–362 identify the type of presorting which has been carried out for the mailing; bytes 363–372 specify the mailpiece ID, which increases or decreases by one, monotonically for each mailpiece; bytes 373–379 specify the job or mailing in process, and with the mailpiece ID uniquely identify the mailpiece; byte 380 flags a break in the mailing; bytes 381–382 specify an outsort bin; and byte 383 specifies whether or not the mailpiece is to be sealed. (Though not shown in FIG. 1, sealers are conventional in inserter systems.)

Other information which can be included in MRDF records can be information such as messages or return addresses or specification of the number of inserts to be added at each insert station. In general the information and format of MRDF records is limited only by the system capabilities and provides substantially unlimited flexibility in controlling mailpiece processing. In particular, incorporation of information which uniquely identifies each mailpiece permits regeneration of misprocessed mailpieces in the manner described below.

While systems such as those described above have proven highly successful, certain disadvantages remain. In particular modem inserter systems operate at extremely high processing rates which require that documents, inserts and envelopes all be moved and handled at high speeds with the result that a small percentage of documents will be misprocessed. Since in many applications it is critical that mailings be complete (e.g. mailing of bills or invoices by suppliers), methods must be provided to regenerate misprocessed mailpieces. Heretofore such methods have relied upon difficult and time consuming reprogramming of a data processing system to regenerate the documents for a misprocessed mailpiece so that the misprocessed mailpiece could be regenerated by the inserter system, or even more difficult and time consuming manual regeneration of misprocessed mailpieces.

Thus it is an object of the subject invention to provide a system, apparatus and method for the preparation and assembly of mailpieces with an improved capability for regeneration of misprocessed mailpieces.

BRIEF SUMMARY OF THE INVENTION

In accordance with the subject invention the above object is achieved and the disadvantages of the prior art are over come by means of a novel method and system for regenerating mailpieces (or other groups of items), the method of the subject invention including: providing an apparatus for assembling the mailpieces, the assembling apparatus including a programmable controller programmed to control assembly of the mailpieces in accordance with coded information included on control documents; providing a data processing system for generating the control documents, each of the control documents corresponding to one of said mailpieces; providing a mechanism for executing an automatic print regeneration program; providing a common data store accessible by said automatic print regeneration program; operating the data processing system to generate said control documents; transporting the control documents to the apparatus for assembling; the programmable controller controlling the apparatus for assembling to assemble the mailpieces in accordance with the coded information; and upon detecting a misprocessed mailpiece writing a record to the common data store; the record identifying the misprocessed mailpiece; and then repetitively activating said automatic print regeneration program to: access the common data store; and upon detection of the record, causing said data processing system to generate a regenerated control document corresponding to the misprocessed mailpiece; and then transporting the regenerated control document to the assembling apparatus; and the programmable controller controlling the assembling apparatus to regenerate the misprocessed mailpiece in accordance with coded information on the regenerated control document.

(As used herein the term regenerate as applied to control documents means reprinting or otherwise recreating control documents, and as applied to mailpieces and the like means assembly of a substantially identical mailpiece, or other grouping of items, in accordance with the regenerated control documents.)

In accordance with one aspect of the invention misprocessed mailpieces are regenerated in sequence corresponding to the sequence in which the misprocessed mailpieces were originally processed.

In accordance with another aspect of the invention the record is written to the common data store as a separate file, whereby contention between the automatic print regeneration program and the programmable controller for access to the file is eliminated.

In accordance with another aspect of the invention the separate file is a zero byte file, a file name for said separate file being selected so as to identify the misprocessed mailpiece.

In accordance with another aspect of the invention the programmable controller identifies the misprocessed mailpiece by testing a status record corresponding to the misprocessed mailpiece against predetermined filter parameters when processing of the misprocessed mailpiece is done.

In accordance with another aspect of the invention the coded information is a pointer to a mailpiece record for determining assembly of the mailpiece.

In accordance with another aspect of the invention the automatic print regeneration program pauses for a period which is long with respect to the processing time of the assembly apparatus after detection of said record.

In accordance with another aspect of the invention the automatic print regeneration program reads a plurality of additional records identifying other misprocessed mailpieces from the common data store with the record, and causes the data processing system to regenerate control documents for the other misprocessed documents with the control document.

In accordance with still another aspect of the invention, a method for controlling an inserter system to regenerate misprocessed mailpieces includes the steps of: identifying the misprocessed mailpiece; writing a record identifying the misprocessed mailpiece to a common data store accessible by a data processing system; inputting the record to the data processing system; said data processing system regenerating a control document associated with the misprocessed mailpiece in accordance with the record, the control document specifying assembly of the misprocessed mailpiece; and then inputting the regenerated control document to the inserter system; the inserter system assembling another mailpiece substantially in accordance with specifications for the misprocessed mailpiece on the regenerated control document.

In accordance with another aspect of the invention identification the misprocessed mailpiece is carried out by testing a status record corresponding to the misprocessed mailpiece against predetermined filter parameters when processing of the misprocessed mailpiece is done.

In accordance with still yet another aspect of the invention a system for assembling mailpieces and regenerating misprocessed mailpieces comprises: an inserter system; a controller for controlling the inserter system to assemble the mailpieces in accordance with information included on control documents; apparatus for detecting a misprocessed mailpiece; apparatus responsive to the detecting apparatus for writing a record identifying the misprocessed mailpiece to a common data store, whereby a control document corresponding to the misprocessed mailpiece can be regenerated in accordance with the record by control document generating apparatus having access to the common data store; and wherein the system processes the regenerated control documents to regenerate the misprocessed mailpiece.

In accordance with another aspect of the invention the detecting means and the writing means are comprised in the controller.

In accordance with another aspect of the invention the control documents specify the mailpieces by use of pointers to corresponding mailpiece records for determining assembly of the mailpieces.

In accordance with another aspect of the invention the system further comprises a data processing system responsive to the record to regenerate a control document corresponding to the misprocessed document.

DETAILED DESCRIPTION OF PREFERRED EMBODIMENTS OF THE SUBJECT INVENTION

Figure 2:
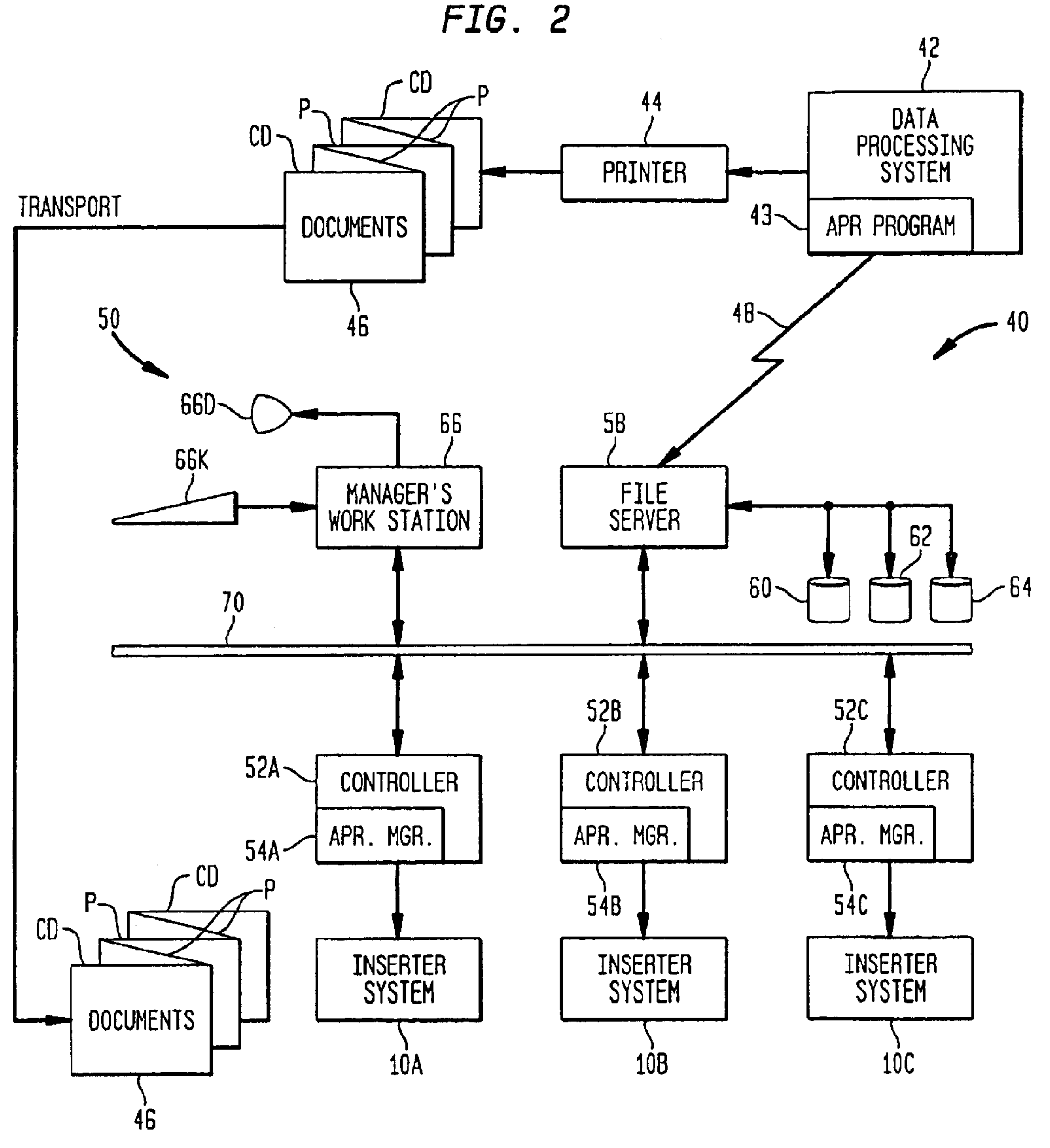
FIG. 2 shows a schematic block diagram of a system for preparing mailpieces and regenerating misprocessed mailpieces.

FIG. 2 shows mail preparation system 40 which includes data processing system 42 and mailpiece assembly system 50.

Data processing system 42 is programmed in a conventional manner to generate documents 46, which include control documents CD and associated documents P; with one control document CD and its associated documents P being associated with each mailpiece, wherein control documents CD are marked with barcode pointers to mailpiece records in the manner described above. In the embodiment shown, system 42 controls printer 44 to print documents 46 directly and documents 46 are transported physically for assembly; however, any convenient method of output ant transport, such as electronic output and transmission for remote printing, can be used and is within the contemplation of the subject invention.

Data processing system 42 also generates and outputs a mailing control file, (hereinafter sometimes mail run data file, or MRDF) which includes a plurality of mailpiece records, in a conventional manner. The mailpiece records each include a plurality of fields containing data for controlling assembly of the mailpiece. The mailing control file is communicated to mailpiece assembly system 50 through communications link 48, which can utilize any convenient form of communication, such as electronic data communication or the physical transfer of media without departing from the scope the subject invention.

Data processing system 42 is also programmed with an automated print regeneration program (hereinafter sometimes APR program) which monitors common data store 62 to identify misprocessed mailpieces and control system 42 to regenerate the associated document set, including the control document for the misprocessed mailpiece, as will be further described below.

In the embodiment shown in FIG. 2, mailpiece assembly system 50 includes inserter systems 10A, 10B, and 10C, which are substantially similar to conventional inserter system 10 described above with reference to FIG. 1, of the type wherein control documents CD include a barcode pointer to a mailpiece record. The method of the subject invention can be used with inserter systems using dash code to control assembly of the mailpieces, but, as will be more clearly seen from the description below, the subject invention requires that control document CD uniquely identify its associated mailpiece. Typically, due to space limitations on the face of control documents, dash codes typically do not include such information. Thus in a particularly advantageous and preferred embodiment, the subject invention is used in combination with inserter systems controlled through an MRDF, since the ability to regenerate control documents while a mailing is still being processed and the MRDF is still accessible on-line allows rapid regeneration of any misprocessed mailpieces. In other embodiments different types of inserter systems having expanded (e.g. more insert modules ) or different functions (e.g. matched mail generation or address verification) can be used without departing from the scope of the subject invention.

Mailpiece assembly system 50 also includes controllers 52A, 52B, and 52C for controlling operation of inserter systems 10A, 10B, and 10C in a manner which will be described more fully below. Controllers 52A, 52B, and 52C are also programmed with an automated print regeneration manager (hereinafter sometimes APR manager), which writes records to the APR data store identifying misprocessed mailpieces.

Mailpiece assembly system also includes file server 58 which manages MRDF data store 60 which stores mailing control files downloaded from data processing system 42, and which also communicates appropriate mailing control files to controllers 52A, B or C as mailings are assigned to inserter systems, as will be more fully described below. Server 58 also controls automatic print regeneration (hereinafter sometimes APR) data store 62 which stores records of misprocessed mailpieces, as will be further described below. Data store 64 stores a "Select File" which contains sequential records of the identification numbers of misprocessed mailpieces identified by controllers 52A, 52B and 52C, as will be described further below. Generation of such Select Files is well known in the art. (Data stores 60, 62 and 64 are preferably stored on a common storage device but are shown separately for ease of illustration. In general such data stores can be maintained on any device or system which is conveniently accessible without departing from the scope of the subject invention, and are preferably maintained on common network mapped drives accessible by APR program 42 and controllers 52A, 52B, and 52C.)

Mailpiece assembly system also includes manager's workstation 66, which includes display 66D and keyboard 66K through which a site manager can access and edit data stores 60 and 62 and can assign mailings to various inserter systems.

Communications among workstation 66, file server 58 and controllers 52A, B and C is preferably carried out over conventional local area network 70 in a manner well understood by those skilled in the art and which need not be discussed further for an understanding of the subject invention.

Figure 3A:
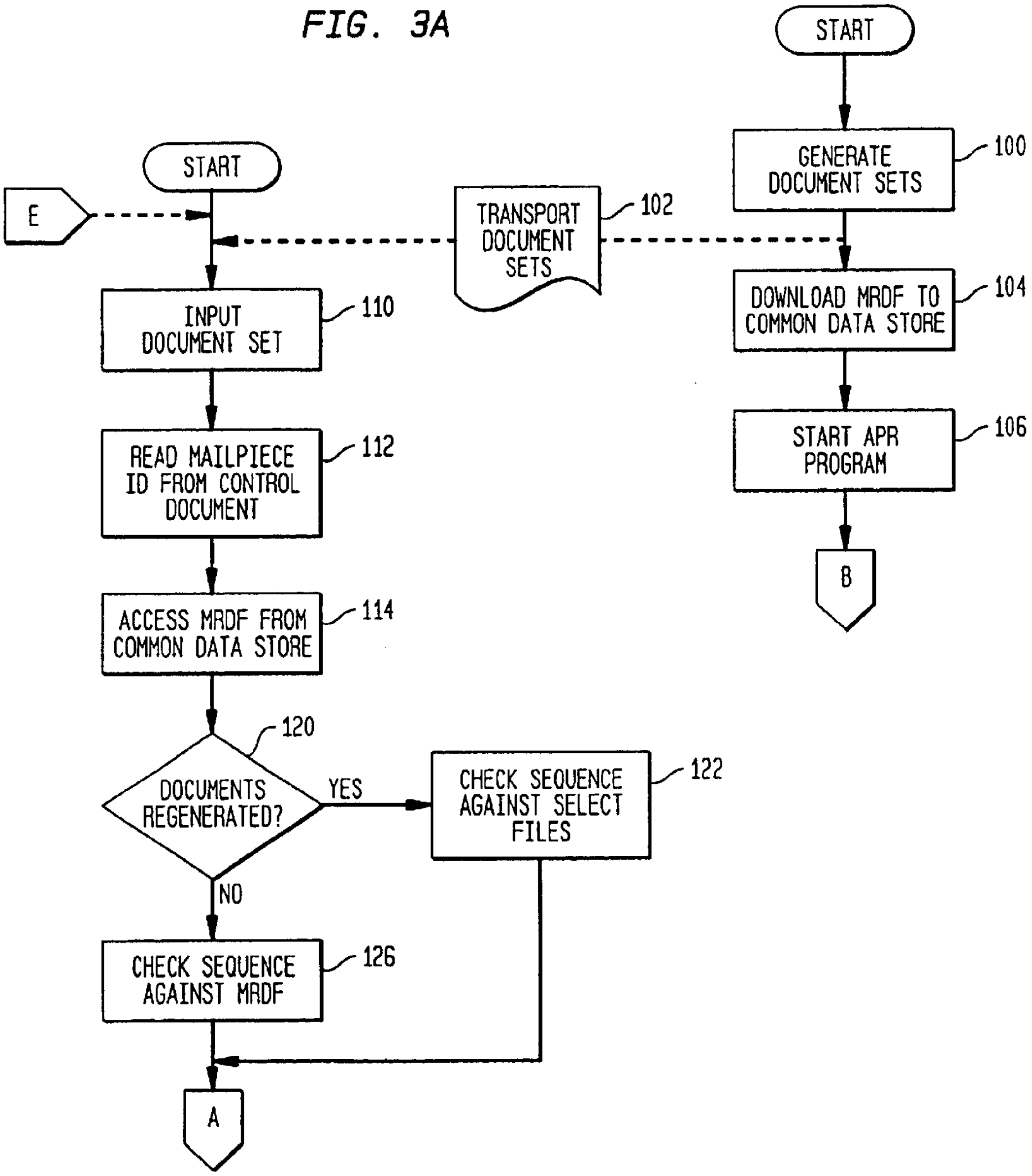
FIGS. 3A-3C show a flow diagram of the operation of the system of FIG. 2.

Turning to FIGS. 3A, B, and C, a high level flow diagram of the operation of mail preparation system 40 in accordance with the method of the subject invention is shown.

At 100 data processing system 42 generates document sets 46 for a mailing. Each of sets 46 corresponds to a particular mailpiece and includes a control document CD and any associated pages P. Each of control documents CD includes coded information which is used by one of controllers 52A, 52B, or 52C to control corresponding inserter system 10A, 10B, or 10C (hereinafter assumed to be controller 52A and system 10A) to assemble the corresponding mailpiece. At 102 the document sets are transported to inserter system 10A. In the embodiment shown, documents are printed locally by printer 44 and physically transported to system 10A, but in other preferred embodiments the documents can be generated in any convenient manner such as on portable magnetic media, or by electronic transmission for remote printing.

Then, at 104, data processing system 42 downloads an MRDF to data store 60 through file server 58. As described above the MRDF comprises mailpiece records defining assembly of each mailpiece MP in the mailing, as is well known in the art, and control documents CD include barcode pointers identifying corresponding records in a similarly well known manner. In other embodiments control documents CD can include conventional dash code for direct control of the assembly of the mailpiece, and uniquely identifying the mailpiece, without departing from the scope of the subject invention.

Then, at 106, data processing system 42 starts APR program 43 to monitor APR records stored in data store 62, as will be further described below.

Figure 3B:
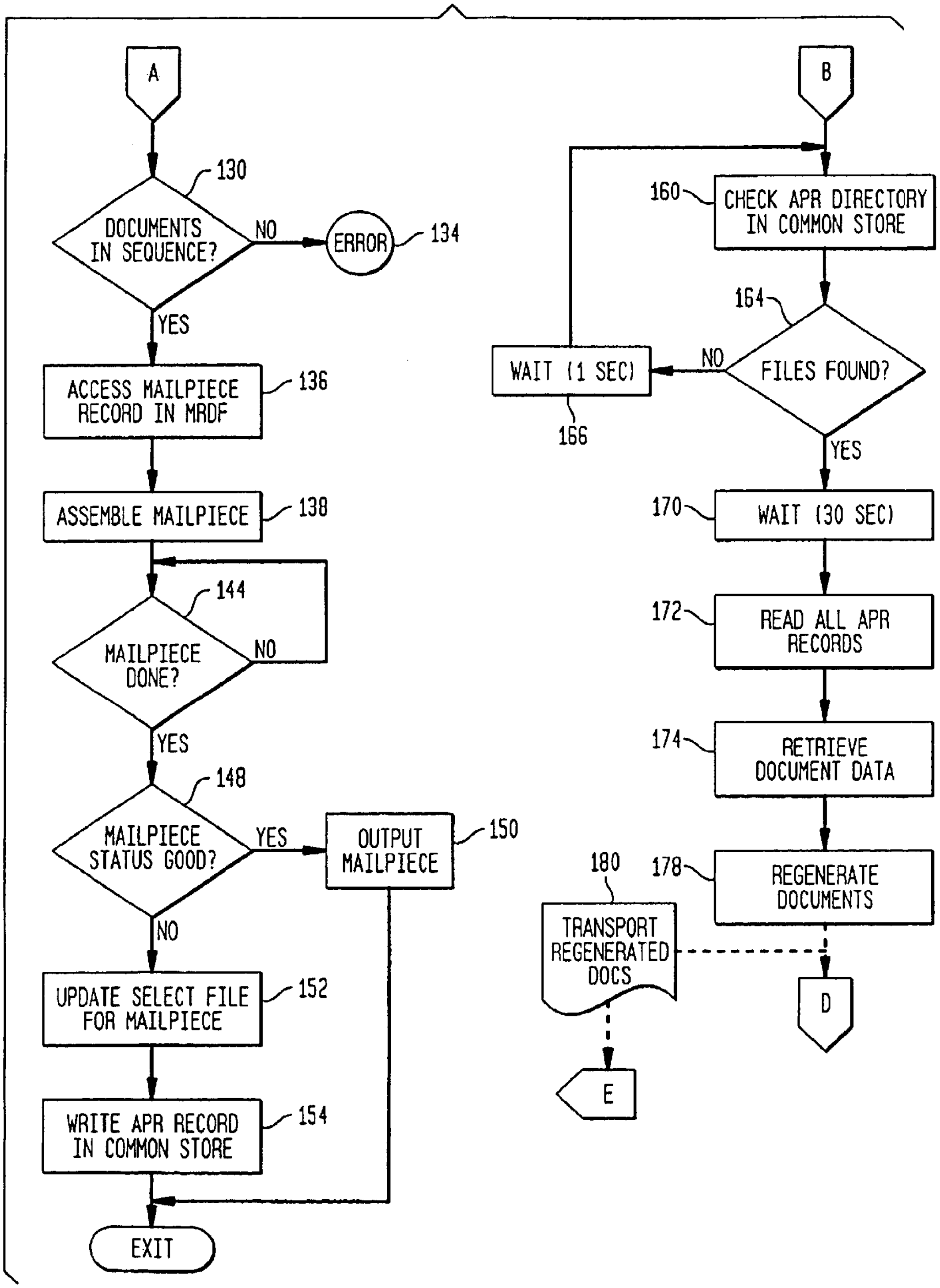
Figure 3C:
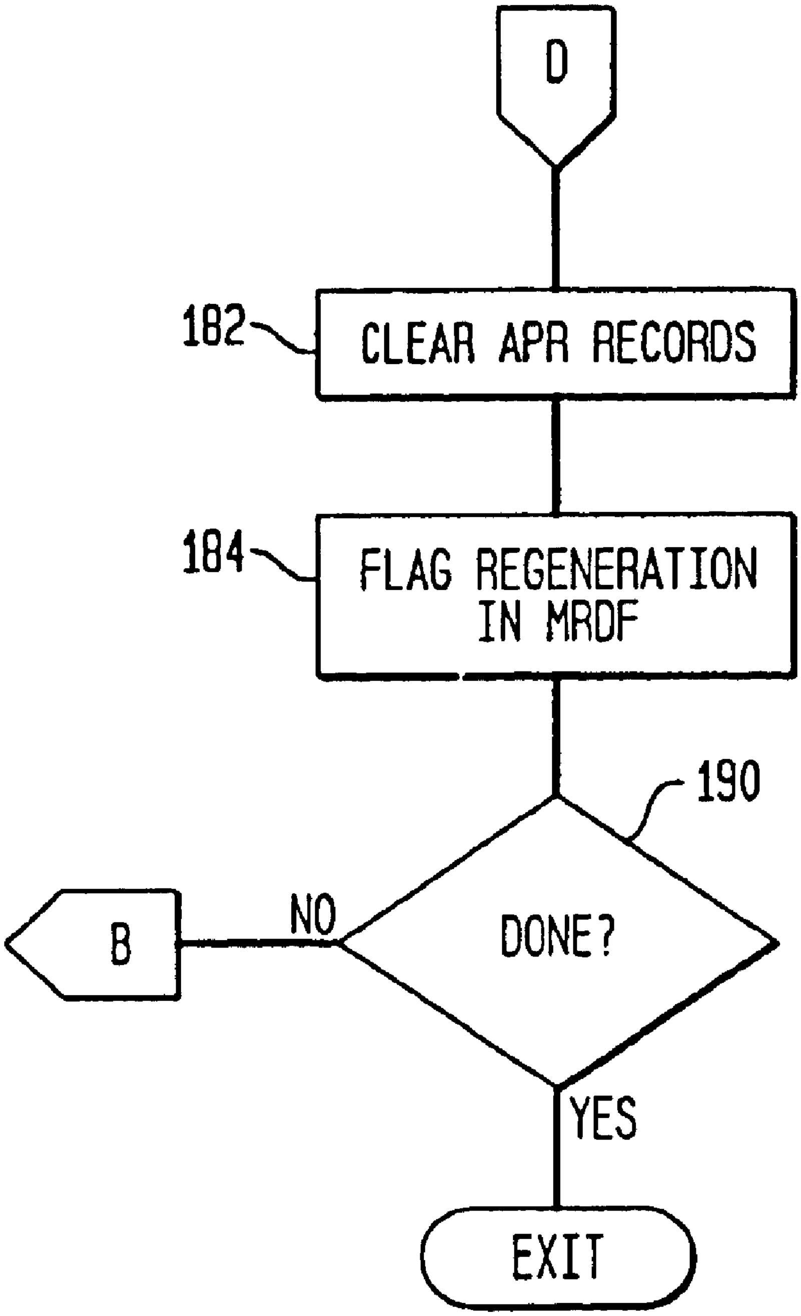

(While in the embodiment shown in FIGS. 3A-C, for clarity of description, only a single mailing and APR data store are described, those skilled in the art will recognize that in many embodiments multiple mailings can be in process at one time. Thus APR program 43 will preferably have a capability to track multiple mailings and associated APR files and will normally be running on system 42 in the background. Those skilled in the art will also recognize that though APR program 43 is shown running on data processing system 42 program 43 can run on any convenient system which communicates with system 42 so long as APR program 43 can cause system 42 (or another system having access to the original data) to access its original data and regenerate document sets for misprocessed mailpieces.)

When document sets 46 reach inserter system 10A documents 46 are input in sequence at 110, mailpiece identification numbers are read at 112, and the MRDF in data store 60 is accessed to read the corresponding mailpiece record. Such initial input operations are well known to those skilled in the mailing art and need not be discussed further for an understanding of the subject invention.

Figure 1:
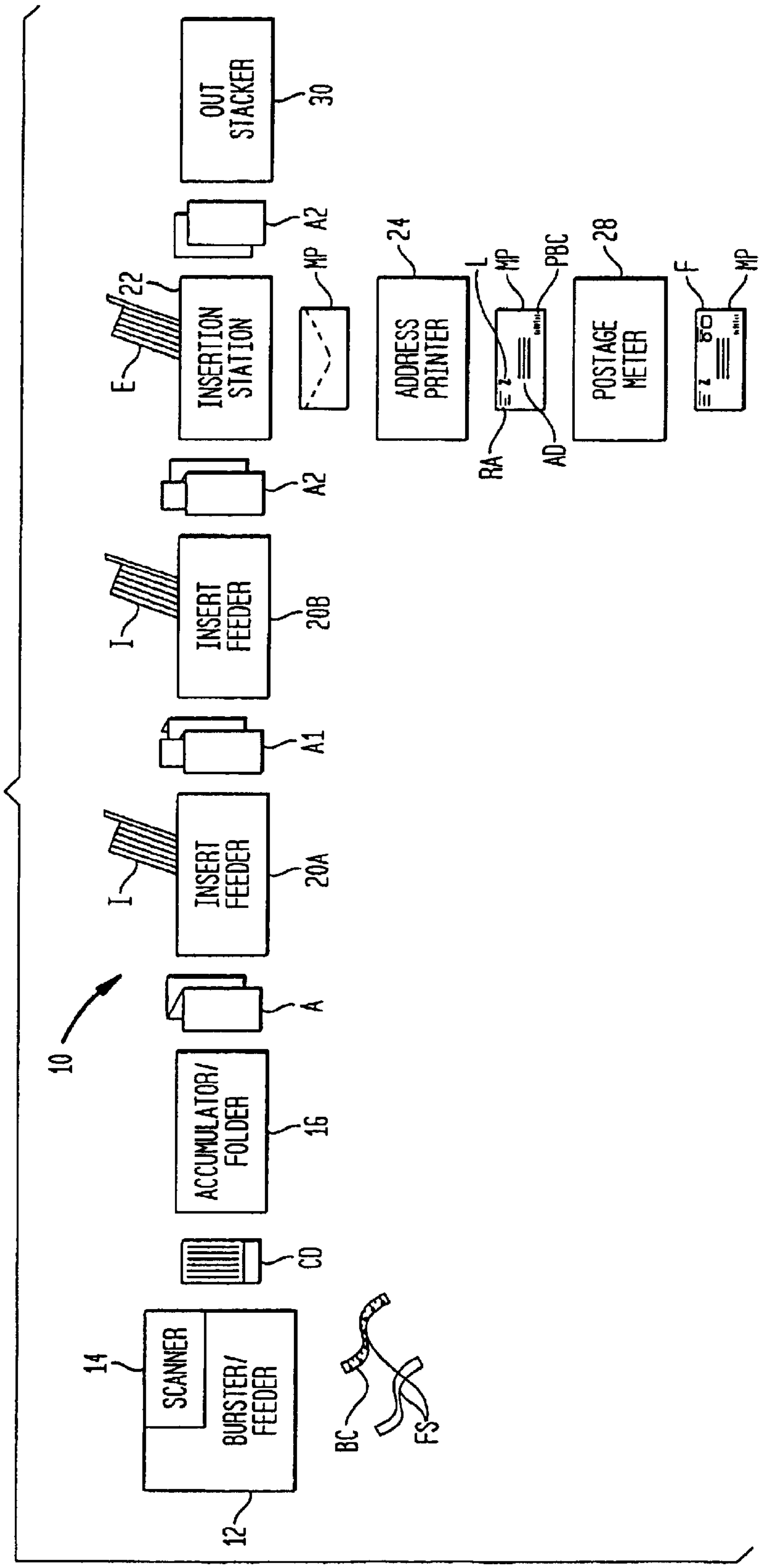
FIG. 1 (PRIOR ART)
FIG. 1 shows a schematic block diagram of a prior art inserter system.

(Those skilled in the art will recognize that inserter systems as shown in FIG. 1 comprise a series of stations through which partially completed mailpieces MP progress in sequence as they are processed. Thus, though operations of inserter 10A are shown with respect to a single mailpiece MP in FIGS. 3A-C, those skilled in the art will recognize that controller 52A is programmed to concurrently control assembly of all of mailpieces MP being processed by system 10A at any one time. Also, as used in the description set forth below the term "mailpiece" includes "accumulations', as described above, as required by context.)

Then at 120 controller 52A checks to determine if the documents have been regenerated; that is whether the documents correspond to the initial processing of mailpiece MP or correspond to one of mailpieces MP which has been previously misprocessed. This information can be input through manager's work station 66 when one or more mailpieces are to be regenerated, or, in other embodiments, the corresponding mailpiece record is updated to reflect previously processed mailpieces. If, at 120, it is determined that mailpiece MP is regenerated then the sequence of mailpiece identification numbers is checked against the Select File in data store 64, otherwise it is checked against the MRDF sequence, where each successive mailpiece identification numbers must be incremented or decremented by one.

Monitoring the sequence of mailpiece identification numbers is a well known technique for maintaining the quality of a mailing. Typically each successive mailpiece identification number is incremented (or decremented) by one for each successive mailpiece. Thus, a sequence . . . 2,3,4,6 . . . is a clear indication that a mailpiece has been misprocessed. However, by definition, regenerated mailpieces will be processed out of sequence with respect to the MRDF. Accordingly in the subject invention when a mailpiece MP is regenerated its sequence is checked against the Select File. As discussed above, a Select file is a conventionally maintained file of the sequence of identification numbers of misprocessed mailpieces which are generated by inserter systems after misprocessed mailpieces are detected. By checking the identification numbers against the Select File quality assurance is maintained even during processing of regenerated mailpieces. It is important to note that though the increments between successive regenerated mailpiece identification numbers will be substantially random, regenerated mailpieces will be processed in a monotonically increasing (or decreasing) sequence corresponding to the sequence in which the misprocessed mailpieces were originally input to inserter system 10A so that misprocessed regenerated mailpieces can be accurately identified.

It is important to note that preserving the original sequence of misprocessed mailpieces provides important advantages in maintaining the integrity of the mailing; e.g. assuring that all mailpieces are processed, assuring that the mailing meets pre-sort requirements for discounted postage rates, etc.

Then at 130 controller 52A tests to determine if mailpiece MP is in sequence. If it is determined that it is not in sequence at 130 controller 52A exits to an error routine at 134. Otherwise, at 136 controller 52A accesses the corresponding mailpiece record in the MRDF, and, at 138, assembles corresponding mailpiece MP in accordance with data in the mailpiece record. Then, at 144, controller 52A tests to determine if mailpiece MP is done. Mailpiece MP is classified as "done" if it is detected as exiting inserter system 10A, or if a mailpiece with a higher identification number (or lower if mailpieces MP are processed in descending order) is detected as exiting system 10A. If it is determined at 144 that mailpiece MP is not done controller 52*a* loops back to 144.

Operations described at 130 through 144 are well known in the mailing art and need not be described further here for an understanding of the subject invention.

When mailpiece MP is done controller 52A tests its status at 148. As is well known in the art, inserter controllers will typically concurrently track status of each mailpiece being processed as it moves through the stations of the inserter system. If, at 148 it is determined that the status of mailpiece MP is good then mailpiece MP is considered to have been properly processed and is output. Otherwise, at 152 controller 52A updates an intermediate file, sometimes known as an "Interlock File", to record the identification number of mailpiece MP as a misprocessed mailpiece; and then, at 154, writes an APR record, which is preferably a zero byte file, identifying mailpiece MP as misprocessed to data store 64. (As is known in the art, the above described "Interlock File" is then used to generate the Select file upon completion of the mailing run.)

In a preferred embodiment the status of mailpiece MP is tested by comparison to predetermined filter parameters established during the initial set up for the mailing. Conventionally an inserter system controller will monitor certain states, selected in accordance with the filter parameters, of a mailpiece as it is processed by the inserter system and record these states in a status record (e.g. the Interlock and Select files). Typically, such states can include, but are not limited to:

Unprocessed pieces
Lost and jammed pieces
Manually removed pieces
Manually rejected pieces
Manually repaired pieces
Pieces left on inserter
Pieces outsorted as "Bad"
Pieces outsorted as "Maybe"

During initial set-up a system operator can initialize the regeneration operation by selecting one or more of these states as filter parameters. If during the above described status test any selected state is found for mailpiece MP, mailpiece MP is selected for regeneration as described above.

Controller 52A then exits. (i.e. With respect to the single mailpiece described. As discussed above, controller 52A will continue to concurrently control assembly of other mailpieces on inserter system 10A until the mailing is complete.)

While in the preferred embodiment described above programming for tracking misprocessed mailpieces, sometimes referred to as an APR manager, is incorporated into controller 52A, in other embodiments another processor, for example workstation 66, having appropriate access over network 70 can be programmed to monitor Interlock Files for various inserter systems and write APR files to corresponding APR data stores.

Returning to data processing system 42 and APR program 43, at 160 program 43 checks the APR directory in data store 64 to determine if any APR records have been written to data store 64 by controller 52A.

As discussed above, in a preferred embodiment, each record of a misprocessed mail piece is written as a separate zero byte file to eliminate contention between controller 52A and APR program 43 for file access. Generally zero byte files are preferred, with the file name serving to identify the misprocessed mailpiece. However, in other embodiments where other information is needed to regenerate control document CD, for example an account number to be charged with regeneration costs, the APR file can include data needed to regenerate the mailpiece.

Then at 164 program 43 tests to determine if APR files have been found. If, at 164, files have not been found program 43 loops back through a one second pause at 166 to 160. Otherwise, if files are found, APR program 43 pauses for approximately thirty seconds at 170. This pause at 170 is not absolutely necessary to the subject invention but is preferred since it increases the efficiency of regeneration. Generally misprocessed mailpieces will occur in groups. By pausing for a period of time which is long with respect to the processing time of an inserter system, which typically process mailpieces at a rate on the order of thousands of mailpieces per hour, other related misprocessed mailpieces will be identified and can be regenerated as a group more efficiently.

Then at 172 program 43 reads all records, i.e. all APR files. In another, preferred embodiment APR program will only read a predetermined maximum number of APR files from data store 64, typically about twenty. By limiting the number of mailpieces to regenerated to such maximum the overall efficiency of the regeneration process has been found to be optimized.

Then at 174 and 178, APR program 43 causes data processing system 42 to retrieve the original data for document sets 46 associated with misprocessed mailpieces and regenerate such document sets 46.

Then at 180 regenerated document sets 46 are transported to inserter system 10A in the same manner as described above at 102. As can be seen in FIG. 3A, regenerated documents are then input to system 10A and processed in the manner described above.

Then at 182 program 43 clears the APR files to avoid repetitive regeneration of mailpieces.

Then at 184 program 43 optionally flags the mailpiece records in the MRDF to identify the regenerated documents. Alternatively a system operator can identify the regenerated documents, as described above.

Then at 190 program 43 tests to determine if the mailing is done. Typically the mailing is considered as done when system 10A signals that all mailpieces MP have been successfully processed; perhaps after multiple iterations of the APR process; or when an operator indicates that the remaining misprocessed mailpieces can be manually processed, ignored or otherwise handled.

At 190 if the mailing is not done program 43 loops back 160. Otherwise program 43 exits. (i.e. With respect to the mailing described. As discussed above, typically APR program 43 will continually execute to regenerate documents for other mailpieces misprocessed in other mailings.)

It will also be apparent to those skilled in the art that, while the subject invention is preferably intended for use in the preparation of large mailings, in other embodiments the subject invention can be used for other applications. For example, in another embodiment the control document can be a freight bill used to control conventional automated "picking" systems to assemble small items or packages to form a package for delivery.

The embodiments described above and illustrated in the attached drawings have been given by way of example and illustration only. From the teachings of the present application those skilled in the art will readily recognize numerous other embodiments in accordance with the subject invention. Accordingly, limitations on the subject invention are to be found only in the claims set forth below.

What is claimed is:

1. A method for controlling an inserter system to regenerate misprocessed mailpieces, comprising the steps of:

a) identifying said misprocessed mailpiece;

b) writing a record identifying said misprocessed mailpiece to a common data store accessible by a data processing system;

c) inputting said record to said data processing system;

d) said data processing system regenerating a control document associated with said misprocessed mailpiece in accordance with said record, said control document specifying assembly of said misprocessed mailpiece;

e) inputting said regenerated control document to said inserter system;

f) said inserter system assembling another mailpiece substantially in accordance with specifications for said misprocessed mailpiece on said regenerated control document.

2. A method as described in claim 1 wherein identification of said misprocessed mailpiece is carried out by testing a status record corresponding to said misprocessed mailpiece against predetermined filter parameters when processing of said misprocessed mailpiece is done.

3. A method as described in claim 2 wherein said misprocessed mailpiece is classified as done when a subsequent mailpiece is output by said inserter system.

4. A method as described in claim 2 wherein said filter parameters are programmed by an operator prior to beginning operation of said inserter system.

5. A method as described in claim 1 wherein said control document specifies said misprocessed mailpiece by use of a pointer to a mailpiece record for determining assembly of said misprocessed mailpiece.

6. A system for assembling mailpieces and regenerating misprocessed mailpieces, comprising:

a) an inserter system;

b) a controller for controlling said inserter system to assemble said mailpieces in accordance with information included on control documents;

c) means for detecting a misprocessed mailpiece;

d) means, responsive to said detecting means, for writing a record identifying said misprocessed mailpiece to a common data store, whereby a control document corresponding to said misprocessed mailpiece can be regenerated in accordance with said record by control document generating apparatus having access to said common data store; and wherein e) said system processes said regenerated control documents to regenerate said misprocessed mailpiece.

7. A system as described in claim 6 wherein said detecting means and said writing means are comprised in said controller.

8. A system as described in claim 6 wherein said control documents specify said mailpieces by use of pointers to corresponding mailpiece records for determining assembly of said mailpieces.

9. A system as described in claim 6 further comprising a data processing system responsive to said record to regenerate a control document corresponding to said misprocessed document.

10. A system as described in claim 9 wherein said record is written to said common data store as separate file, whereby contention for access to said file is eliminated.

11. A system as described in claim 10 wherein said separate file is a zero byte file, a file name for said separate file being selected so as to identify said misprocessed mailpiece.

12. A system for assembling groups of items and regenerating misprocessed groups, comprising:

a) an automatic system for selecting items and assembling said selected items into groups;

b) a controller for controlling said automatic system to assemble said groups in accordance with information included on control documents;

c) means for detecting a misprocessed group;

d) means, responsive to said detecting means, for writing a record identifying said misprocessed group to a common data store, whereby a control document corresponding to said misprocessed group can be regenerated in accordance with said record by control document generating apparatus having access to said common data store; and wherein e) said system processes said regenerated control documents to regenerate said misprocessed group.

* * * * *